UNITED STATES PATENT OFFICE.

FORREST SHEPHERD, OF NEW HAVEN, CONNECTICUT, ASSIGNOR TO JOHN B. GRAY, OF STAFFORD COUNTY, VIRGINIA.

IMPROVED WHITE WATER-COLOR PAINT.

Specification forming part of Letters Patent No. 285, dated July 17, 1837.

*To all whom it may concern:*

Be it known that I, FORREST SHEPHERD, of New Haven, in the county of New Haven and State of Connecticut, have invented or discovered a new Manufacture of White Water-Color Paint, using as the base thereof the mineral known under the name of "sulphate of barytes," by means of which a beautiful and perfectly opaque white is obtained; and I do hereby declare that the following is a full and exact description thereof.

Instead of using oil with the barytes, as described by me in the specification attached to Letters Patent of the United States, dated the 18th day of March, in the year 1835, for "A composition to be used as a white paint," I take the same mineral (sulphate of barytes) in its native state and reduce it to an impalpable powder, and I then mix it with water in which there is a sufficient quantity of gum-tragacanth, gum-arabic, or other adhesive gum invisible with water or any other fluid not oleaginous and adapted to give adhesiveness or a binding quality to the pulverized mineral. The composition may, if necessary, be again ground after mixture. This I lay on as a water-paint, and when properly prepared it is of a clear white color, and perfectly opaque. The paint thus prepared adheres very firmly to wood, &c., and will be found extremely useful, especially when it is not exposed to the vicissitudes of the weather, and in situations where it is so exposed it may be rendered permanent by a coating of good clear oil or spirit-varnish. Various tints and shades of color may also be given to it by a proper admixture of any suitable pigment, as in the case of the oil-paint. The water-paint may also be very advantageously applied as a ground-coat upon work which is afterward to be covered by the oil-paint.

I am aware that the artificial or fictitious sulphate of barytes has been used as a water-color by miniature-painters, and in other delicate works; but the application of the mineral or natural sulphate as a water-color is, as I believe, new and of my invention or discovery.

What I now claim, therefore, and desire to secure by Letters Patent, is—

The employment of the natural or mineral sulphate of barytes as a water color or paint, whatever aqueous fluid may be preferred as its vehicle, and whatever gummy or tenacious material or pigment may be mixed therewith.

FORREST SHEPHERD.

Witnesses:
THOS. P. JONES,
J. B. GRAY.